Figure 1:
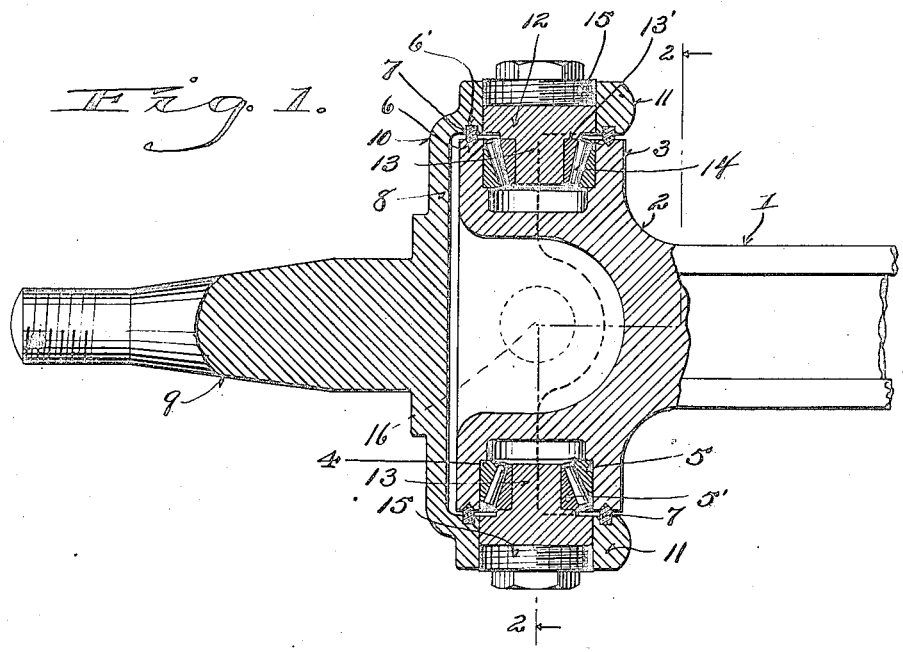

R. M. KANIK.
STEERING KNUCKLE.
APPLICATION FILED AUG. 9, 1920.

1,372,883.

Patented Mar. 29, 1921.

Inventor:
Rudolph M. Kanik
By Young & Young
Attorneys.

Witness:
R. E. Weber

UNITED STATES PATENT OFFICE.

RUDOLPH M. KANIK, OF CLINTONVILLE, WISCONSIN.

STEERING-KNUCKLE.

1,372,883. Specification of Letters Patent. Patented Mar. 29, 1921.

Application filed August 9, 1920. Serial No. 402,222.

*To all whom it may concern:*

Be it known that I, RUDOLPH M. KANIK, a citizen of the Austrian Republic, and resident of Clintonville, in the county of Waupaca and State of Wisconsin, have invented certain new and useful Improvements in Steering-Knuckles; and I do hereby declare that the following is a full, clear, and exact description thereof.

My invention refers to steering knuckles, and it has for its object to provide a two-piece steering knuckle so arranged and constructed as to eliminate loose parts, reduce the cost of manufacture, with provision for adjusting the vertically disposed bearings, the primary parts comprising a one-piece hollow head which is nested within the corresponding one-piece hollow shell, the parts being locked together by means of the bearings which are combined to constitute both radial and thrust bearings.

With the above object in view, the invention consists in certain peculiarities of construction and combination of parts, as are herein set forth with reference to the accompanying illustrations and subsequently defined in claim.

Figure 2:
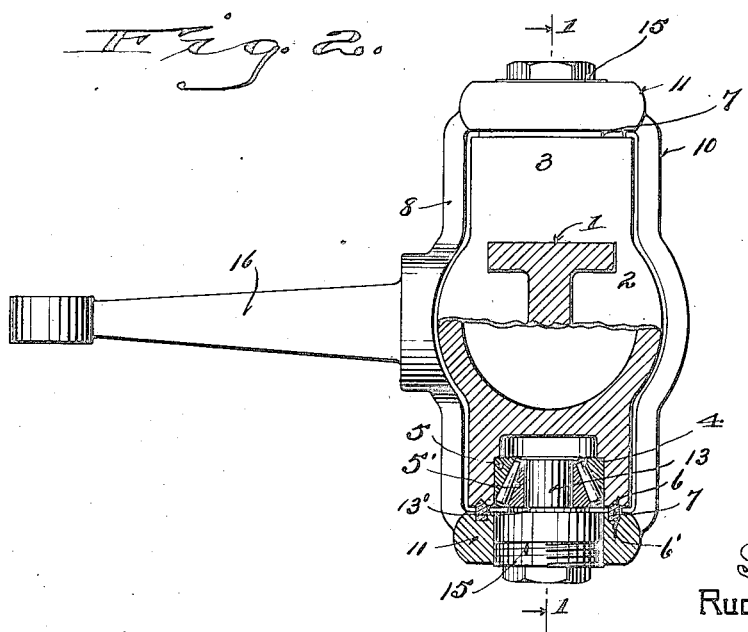

In the drawings:

Figure 1 represents a sectional elevation of a steering knuckle, embodying the features of my invention, the section being indicated by line 1—1 of Fig. 2, and Fig. 2 is a sectional elevation of the same, the section being indicated by line 2—2 of Fig. 1, with parts broken away and parts in section, to more clearly illustrate the structural features.

Referring by characters to the drawings, 1 represents an axle which terminates with a hollow circular head 2 that is opened at its end.

Extending from the circular outer walls of the head is a pair of cups 3, which cups are in axial alinement and vertically disposed. Each cup is reamed out to form a shoulder 4 that is adapted to have seated thereon a female bearing race ring 5.

The upper edge face or lip of each cup is formed with a V-shaped annular gasket groove 6, and is adapted to receive the correspondingly lower V-shaped edge of a gasket 7.

Nested over the circular portion and also the cup portions of the head, is a circular one-piece axle shell 8, the same being open at its rear end and closed at its front end to form a wall from which projects an axle spindle 9. This shell is provided with a pair of semi-circular neck portions 10, which project from its circular wall and which neck portions terminate with horizontally disposed sleeves 11, the same being in axial alinement with the head cups and spaced slightly from the lips of these cups so as to facilitate assemblage. The inner edge faces of the sleeves are formed with annular grooves 6', which grooves are adapted to receive the upper edges of gaskets 7. Thus in assemblage it will be seen that the parts can be readily slipped one over the other, and that the yielding gaskets 7 will readily slide over the cup-lips and find their seats within the grooves 6.

Fitted into each sleeve is a plug 12, having an inwardly extended shoulder 13', from which springs a central stud portion 13, the shoulder and stud portion of the plug are adapted to receive a male bearing race ring 5', which may be shrunk or otherwise secured in place. This bearing race, in conjunction with the bearing 5 forms friction surfaces for a set of obliquely disposed conical rollers 14, and it will be observed that the shoulder 13' of the plug, where it merges into the collar proper, forms a cavity space to permit take-up for the bearings, and provide for clearance. The plugs are adjustably held in place by threaded caps 15, which caps are in threaded union with the correspondingly threaded inner walls of the sleeves 11, whereby adjustment of the bearings may be effected.

From the foregoing description it will be observed, that the primary elements of the joint are adapted to be readily cast into units and that very little machine work is necessary, and that furthermore the parts can be quickly assembled with the assistance of those not necessarily skilled in the art mechanism. As clearly shown, the shouldered cup forms bottom cavity for the reception of a grease packing, which packing is inserted in assemblage. As shown in Fig. 2, the shell is provided with a steering arm 16, which projects from one side thereof.

I claim—

A steering knuckle comprising an axle having a hollow circular head having vertically disposed complementary cups, the bowls of which are counter-bored to form a bottom shoulder, the outer edge lip of the cup being provided with annular gasket grooves, a one-piece circular axle shell fitted over the circular head, the shell having an open rear end and a closed front, semi-circular neck portions extending from the shell body and adapted to be fitted about the head cups, the neck portions terminating with sleeves having their outer ends internally threaded and their lower edge faces provided with gasket grooves to correspond with the grooves of the head cups, gaskets carried by the sleeve grooves and engaging the cup grooves, plugs fitted into the sleeves having inwardly extended shoulders terminating with studs, bearing race rings fitted into the cup cavity and against its shoulders, other bearing race rings fitted over the plug studs and engaging their shoulder portions, a series of anti-friction rollers fitted between the race rings, the same being inclined toward the axis of the cups, confining caps for the plugs in threaded union with the sleeves, an axial spindle extending from the closed front wall of the shell, and a steering arm extending transversely from the shell body.

In testimony that I claim the foregoing I have hereunto set my hand at Milwaukee, in the county of Milwaukee and State of Wisconsin.

RUDOLPH M. KANIK.